(12) United States Patent
Jeffries et al.

(10) Patent No.: US 7,500,012 B2
(45) Date of Patent: Mar. 3, 2009

(54) METHOD FOR CONTROLLING DATAFLOW TO A CENTRAL SYSTEM FROM DISTRIBUTED SYSTEMS

(75) Inventors: Clark D. Jeffries, Durham, NC (US); Charles S. Lingafelt, Durham, NC (US); Norman C. Strole, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 10/814,838

(22) Filed: Mar. 31, 2004

(65) Prior Publication Data
US 2005/0223056 A1 Oct. 6, 2005

(51) Int. Cl.
*G06F 15/173* (2006.01)
(52) U.S. Cl. .................. 709/238; 709/201; 709/232; 370/230
(58) Field of Classification Search .............. 709/201, 709/238
See application file for complete search history.

(56) References Cited

U.S. PATENT DOCUMENTS

| | | | |
|---|---|---|---|
| 4,475,192 A | 10/1984 | Fernow et al. | |
| 5,339,313 A | 8/1994 | Ben-Michael et al. | |
| 5,361,372 A | 11/1994 | Rege et al. | |
| 6,031,821 A | 2/2000 | Kalkunte et al. | |
| 6,188,698 B1 | 2/2001 | Galand et al. | |
| 6,198,750 B1 | 3/2001 | Buchholz et al. | |
| 6,212,162 B1 | 4/2001 | Horlin | |
| 6,229,789 B1 * | 5/2001 | Simpson et al. ............. 370/235 |
| 6,249,519 B1 * | 6/2001 | Rangachar .................. 370/356 |
| 6,434,620 B1 * | 8/2002 | Boucher et al. ............. 709/230 |
| 6,665,755 B2 * | 12/2003 | Modelski et al. ............ 710/100 |
| 7,177,276 B1 * | 2/2007 | Epps et al. .................. 370/230 |
| 7,215,637 B1 * | 5/2007 | Ferguson et al. ......... 370/230.1 |
| 7,313,614 B2 * | 12/2007 | Considine et al. ........... 709/223 |
| 2002/0095519 A1 * | 7/2002 | Philbrick et al. ............ 709/250 |
| 2002/0116594 A1 * | 8/2002 | Cox ........................... 711/205 |
| 2002/0118640 A1 * | 8/2002 | Oberman et al. ............ 370/230 |

(Continued)

FOREIGN PATENT DOCUMENTS

CA 2322406 4/2001

OTHER PUBLICATIONS

IEEE Xplore, *A Simple Packet Scheduling and Buffer Management Scheme for Scalable Support of QoS in the Internet*, K.J. Loh and K.C. Chua, Oct. 1999, pp. 276-281.

*Primary Examiner*—William C Vaughn, Jr.
*Assistant Examiner*—Joiya M Cloud
(74) *Attorney, Agent, or Firm*—Sawyer Law Group LLP

(57) ABSTRACT

A method and system for controlling a plurality of pipes in a computer system including at least one central system is disclosed. The pipes provide traffic from a plurality of distributed systems. The method and system include providing a first plurality of data packets from a pipe of the plurality of pipes to a fast path or a slow path during a time interval such that none of the first plurality of data packets is dropped. The first plurality of data packets arrive in a time interval. The fast path includes a fast storage, while the slow path includes a bulk storage. The method and system also include providing a second plurality of data packets from the fast storage or the bulk storage to the central system in a first in first out order during the time interval.

14 Claims, 4 Drawing Sheets

U.S. PATENT DOCUMENTS

| | | | |
|---|---|---|---|
| 2003/0023733 A1* | 1/2003 | Lingafelt et al. | 709/229 |
| 2003/0033486 A1* | 2/2003 | Mizrachi et al. | 711/133 |
| 2003/0058880 A1* | 3/2003 | Sarkinen et al. | 370/413 |
| 2003/0172169 A1* | 9/2003 | Cheng | 709/230 |
| 2004/0003126 A1* | 1/2004 | Boucher et al. | 709/250 |
| 2004/0117438 A1* | 6/2004 | Considine et al. | 709/203 |
| 2004/0158640 A1* | 8/2004 | Philbrick et al. | 709/230 |
| 2005/0002334 A1* | 1/2005 | Chao et al. | 370/230 |
| 2006/0104281 A1* | 5/2006 | Scarr et al. | 370/395.1 |

\* cited by examiner

METHOD FOR CONTROLLING DATAFLOW TO A CENTRAL SYSTEM FROM DISTRIBUTED SYSTEMS

FIELD OF THE INVENTION

The present invention relates to computer networks, and more particularly to a method and system for controlling dataflow from distributed systems to a central system.

BACKGROUND OF THE INVENTION

FIG. 1 depicts a high-level block diagram of a conventional computer system 10 that includes a conventional central system 12 and multiple conventional distributed systems 14, 16, 18, and 20. The conventional distributed systems 14, 16, 18, and 20 can be viewed as communicating with the conventional central system 12 via pipes 13, 15, 17, and 19, respectively. Examples of such conventional computer systems 10 include intrusion detection systems in which the conventional central system 12 detects intrusions based upon distributed clients 14, 16, 18, and 20 that detect input to the conventional computer system 10. Such conventional distributed systems 14, 16, 18, and 20 then alert the conventional central system 10 of the intrusions by providing data packets via pipes 13, 15, 17, and 19, respectively. In the event of an attack, the conventional central computer system 12 may be able to prevent failure of the conventional computer system 10 due to such attacks. Other examples of such systems includes bridge computing or other systems which employ distributed systems, such as the conventional clients 14, 16, 18, and 20 that communicate directly to a conventional central system 12.

Although the system 10 functions, one of ordinary skill in the art will readily realize that the flow of data packets from the multiple conventional distributed systems 14, 16, 18, and 20 through the conventional pipes 13, 15, 17, and 19 is unregulated. In particular, it is possible for the traffic through the conventional pipes 13, 15, 17, and 19 to be sufficiently high that the conventional central system 10 is overwhelmed. For example, if the conventional computer system 10 is being attacked by a flood of packets being denied service (a denial of service attack), then one or more of the conventional distributed systems 14, 16, 18, and 20 may overwhelm the conventional central system 12 by providing an alert for each denial of service. Similarly, if the conventional distributed systems 14, 16, 18, and 20 are simply conventional clients linked to the conventional central system 12 and there is some interruption of service or other accident, one or more of the conventional distributed systems 14, 16, 18, and 20 may provide the conventional central system 12 with multiple notifications of the accident via the conventional pipes 13, 15, 17, and 19, respectively. As a result, the conventional system 10 may fail.

Although there may be many conventional methods for preventing a failure of the conventional system 10 despite unregulated traffic from the conventional distributed systems 14, 16, 18, and 20. For example, a maximum threshold may be placed on traffic from one or more of the pipes 13, 15, 17, and 19. If traffic though the pipes 13, 15, 17, or 19 exceeds this threshold, then the data packets are discarded. However, discarding of packets is undesirable if the excessive flow of data packets is not due to an attack. Furthermore, in some instances, the allocation of resources such as bandwidth might be changed to account for high traffic to the conventional central system 12 from some portion of the distributed systems 14, 16, 18, and 20.

Accordingly, what is needed is a system and method for better controlling traffic from distributed systems to a central system. The present invention addresses such a need.

SUMMARY OF THE INVENTION

The present invention provides a method and system for controlling a plurality of pipes in a computer system including at least one central system. The plurality of pipes provides traffic from a plurality of distributed systems. The method and system comprise providing a first plurality of data packets from a pipe of the plurality of pipes to a fast path or a slow path during a time interval such that none of the first plurality of data packets is dropped. The first plurality of data packets arrive in a time interval. The fast path includes a fast storage, while the slow path includes a bulk storage. The method and system also comprise providing a second plurality of data packets from the fast storage or the bulk storage to the central system in a first in first out order during the time interval.

According to the system and method disclosed herein, the present invention regulates traffic from the distributed system to the central system.

DETAILED DESCRIPTION OF THE INVENTION

The present invention relates to an improvement in control of traffic in computer networks. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for controlling a plurality of pipes in a computer system including at least one central system. The plurality of pipes provides traffic from a plurality of distributed systems. The method and system comprise providing a first plurality of data packets from a pipe of the plurality of pipes to a fast path or a slow path during a time interval such that none of the first plurality of data packets is dropped. The first plurality of data packets arrive in a time interval. The fast path includes a fast storage, while the slow path includes a bulk storage. The method and system also comprise providing a second plurality of data packets from the fast storage or the bulk storage to the central system in a first in first out order during the time interval.

The present invention will be described in terms of a particular system and particular components. However, one of ordinary skill in the art will readily recognize that this method and system will operate effectively for other components in a computer network. For example, the present invention is described in the context of a single central system and a network processor. However, multiple central systems and other components capable of providing analogous functions might be used.

Figure 1:
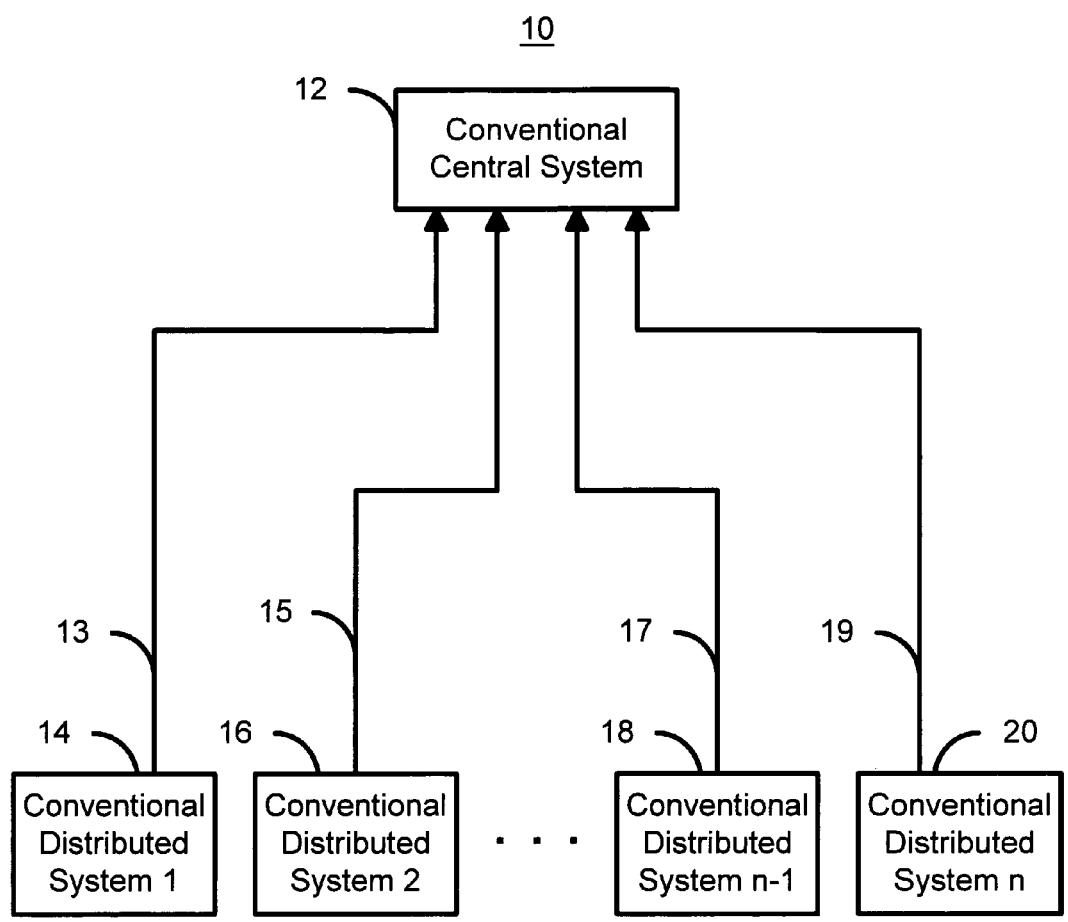
FIG. 1 is a block diagram of a conventional system that provides traffic from distributed systems to a central system.
Figure 2:
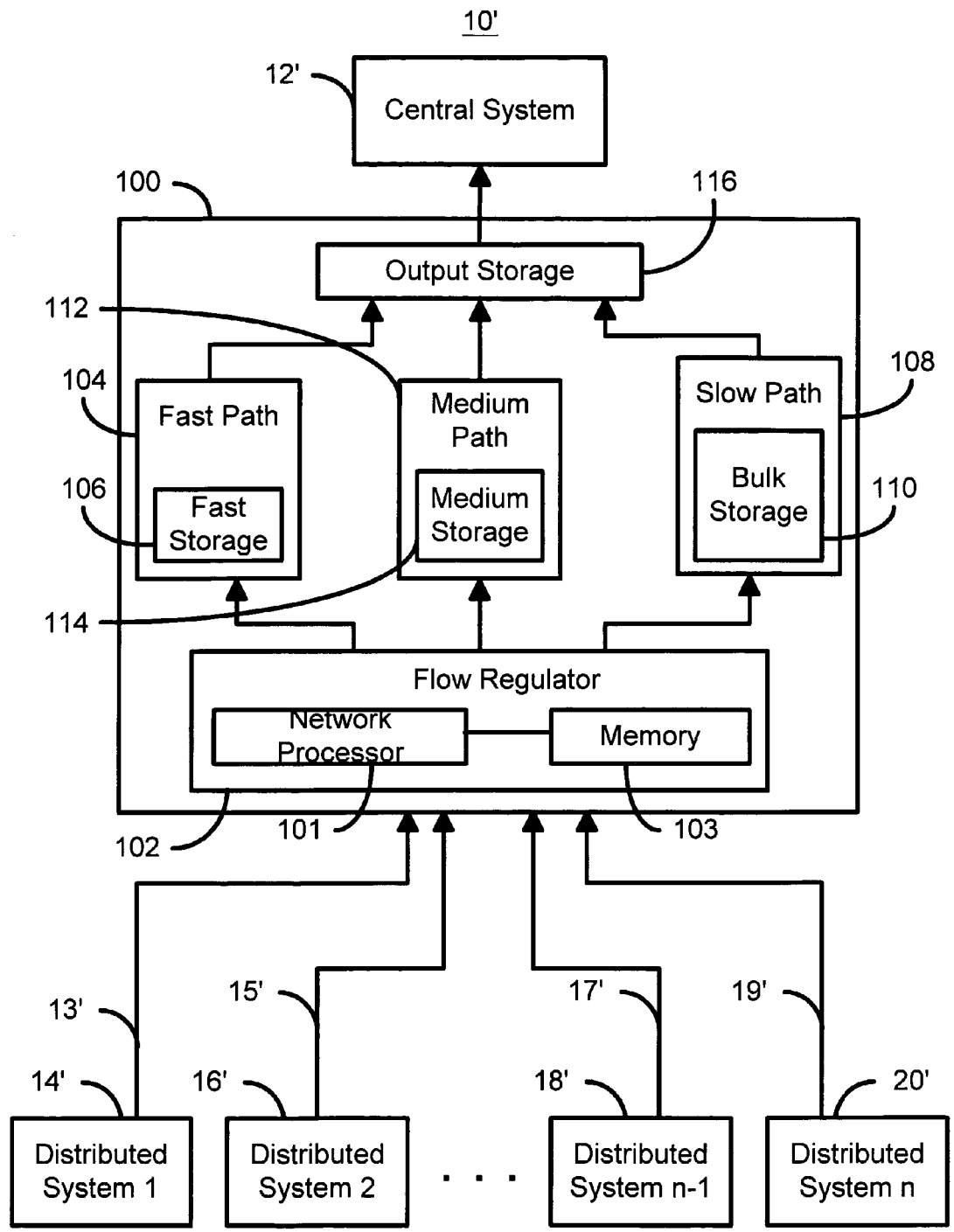
FIG. 2 is a high-level block diagram of one embodiment of a system in accordance with the present invention for controlling traffic from a plurality of distributed systems to a central system.

To more particularly illustrate the method and system in accordance with the present invention, refer now to FIG. 2, depicting a high-level block diagram of one embodiment of a system 100 in accordance with the present invention for controlling traffic from a plurality of distributed systems to a central system. The system 100 is depicted as being used in the computer system 10' that is analogous to the conventional system 10 depicted in FIG. 1. Referring back to FIG. 2, the computer system 10' includes a central system 12', distributed systems 14', 16', 18' and 20', as well as the corresponding pipes 13', 15', 17', and 19', respectively. The system 100 includes a flow regulator 102, a fast path 104 including fast storage 106, a slow path 108 including bulk storage 110, and optional medium paths 112 including optional medium storage 114. In addition, an output storage 116, which is preferably a FIFO output queue, is shown.

The flow regulator 102 preferably includes a memory 103, such as a queue, into which the data packets from the pipes 13', 15', 17', and 19' flow. The flow regulator 102 also includes a processor 101. The processor 101 examines the data packets from each pipe and determines into which path 104, 108, or 112, the data packets are to be transmitted. In a preferred embodiment, the flow regulator 102 contains a network processor 101. Network processors are preferred because such devices have already gained general use in controlling the flow of data packets in networks. Furthermore, network processors can be programmable. The programmability of the network processor 101 allows the flow regulator 102 to adapt to different conditions and applications using changes in the software controlling the network processor 101. Consequently, the system 100 is made more flexible and easy to use. In a preferred embodiment, the network processor 101 preferably selects the path 104, 108, or 112 such that none of the data packets entering the system 100 are dropped. The network processor 101 may operate based on a particular time interval for each pipe 13', 15', 17', and 19'. Thus, in a preferred embodiment, all packets from a particular pipe in the time interval for that pipe are classified in a like manner.

In one embodiment, the fast storage 106 includes a fast memory (e.g. a fast queue) that is relatively small and generally more expensive to manufacture. Similarly, the bulk storage 110 is relatively large, slower, and less expensive. Note that in other embodiments, more than one fast storage 106 and more than one bulk storage 110 could be used. The medium storage(s) preferably include memories with capabilities between the bulk storage and the fast storage. In one embodiment, only the fast path 104 and the slow path 108 are used. Consequently, the present invention is primarily described in the context of the fast path 104 and the slow path 108. As discussed above, the regulator 102 classifies data packets from each of the pipes 13', 15', 17' and 21'; selects the appropriate path 104, 108, or 112; and provides packets from the pipes 13', 15', 17', and 19 to the selected path such that no packets are dropped. Packets are provided from the fast path 104, the slow path 108 and the medium path(s) 112 in a first-in-first-out order.

Figure 3:
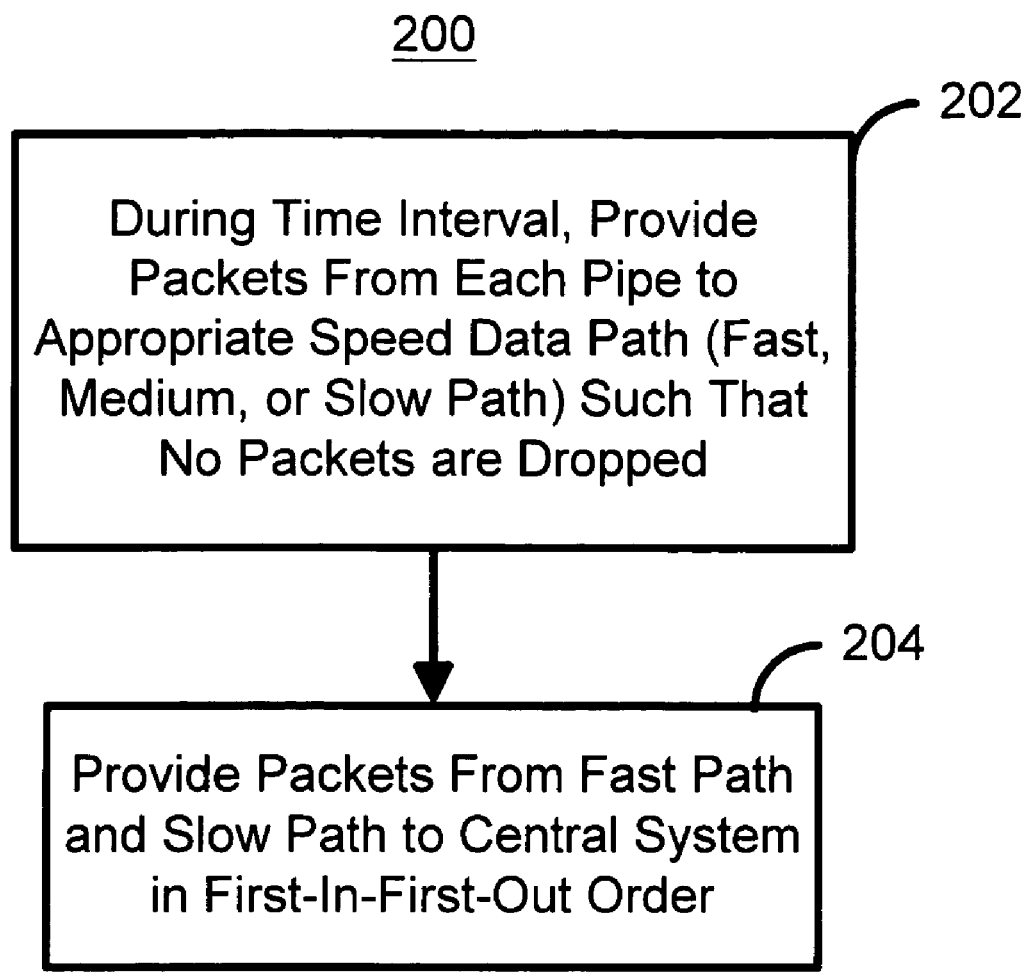
FIG. 3 is a high-level flow chart of one embodiment of a method in accordance with the present invention for controlling traffic from a plurality of distributed systems to a central system.

FIG. 3 is a high-level flow chart of one embodiment of a method 200 in accordance with the present invention for controlling traffic from a plurality of distributed systems to a central system. The method 200 is preferably performed by the system 100 and for the central system 12', pipes 13', 15', 17', and 19' and the distributed systems 14', 16', 18', and 20'. The method 200 will, therefore, be described in the context of the system 100 and other components depicted in FIG. 2. Referring to FIGS. 2 and 3, the method 200 is preferably performed for each pipe 13', 15', 17', and 19'. However, for clarity, the method 200 is described in the context of the pipe 13'. A first plurality of data packets arrive from the pipe 13' in a time interval that is preferably specific to the pipe 13'. Stated differently, the time interval may be different for each pipe 13', 15', 17', and 19'. The first plurality of data packets from the pipe 13' is provided to the appropriate one of the paths 104, 108, or 112 during the time interval for the pipe 13' such that none of the first plurality of data packets is dropped, via step 202. In a preferred embodiment, only the fast path 104 and the slow path 108 are used. In such an embodiment, step 202 provides the first plurality of data packets to the fast path 104 or the slow path 108. The flow regulator 102 preferably determines to which path 104, 108, or 112, each data packet belongs in step 202 and forwards the packet to the appropriate path 104, 108, or 112. Also in a preferred embodiment, each of the first plurality of data packets is treated similarly. Thus, if one data packet in the time interval is provided to the fast path 104, then all data packets for the pipe 13' in the time interval are provided to the fast path 104.

During the time interval, a second plurality of data packets already in the paths 104, 108, and 112 are also provided from the paths 104, 108, and 112 to the central system 12' such that the data packets arrive at the central system 12' in the order received by the system 100, via step 204. Thus, in a preferred embodiment, the data packets are provided from the fast storage 104 or the bulk storage 110 to the output storage 116 and then the central system 12' in a first in first out order during the time interval. The method 200 is preferably repeated for each pipe 13', 15', 17' and 19' over each time interval for that pipe 13', 15', 17' and 19'.

Using the method 200, the system 100 can control traffic provided to the central system 12' from the distributed systems 14', 16', 18', and 20' through the pipes 13', 15', 17' and 19'. Because the data path 104, 108, or 112 is selected such that no packets are dropped, slower paths, such as the slow path 108, having greater storage capacity are used at times of higher congestion. Because the slow path 108 can be selected in times of greater congestion, the central system 12' may not be overwhelmed. In addition, the fast storage 106 does not overflow. The bulk storage 110 is also preferably large enough to avoid overflows. Consequently, no packets are lost. Instead, all packets may be provided to the central system 12' at some point, even for times during very high congestion. Moreover, in a preferred embodiment, selection of the slow path 108 in the step 202 is limited. Instead, the more efficient fast path 104 is generally used. Preferably, the fast storage 106 is used as much as possible. Data packets are preferably shunted to the slow path for the pipe 13' only during times of congestion for the pipe 13'. Consequently, performance of the system 10' is not compromised. Furthermore, the data packets are provided from the fast path 104 and the slow path 108 in order.

Figure 4:
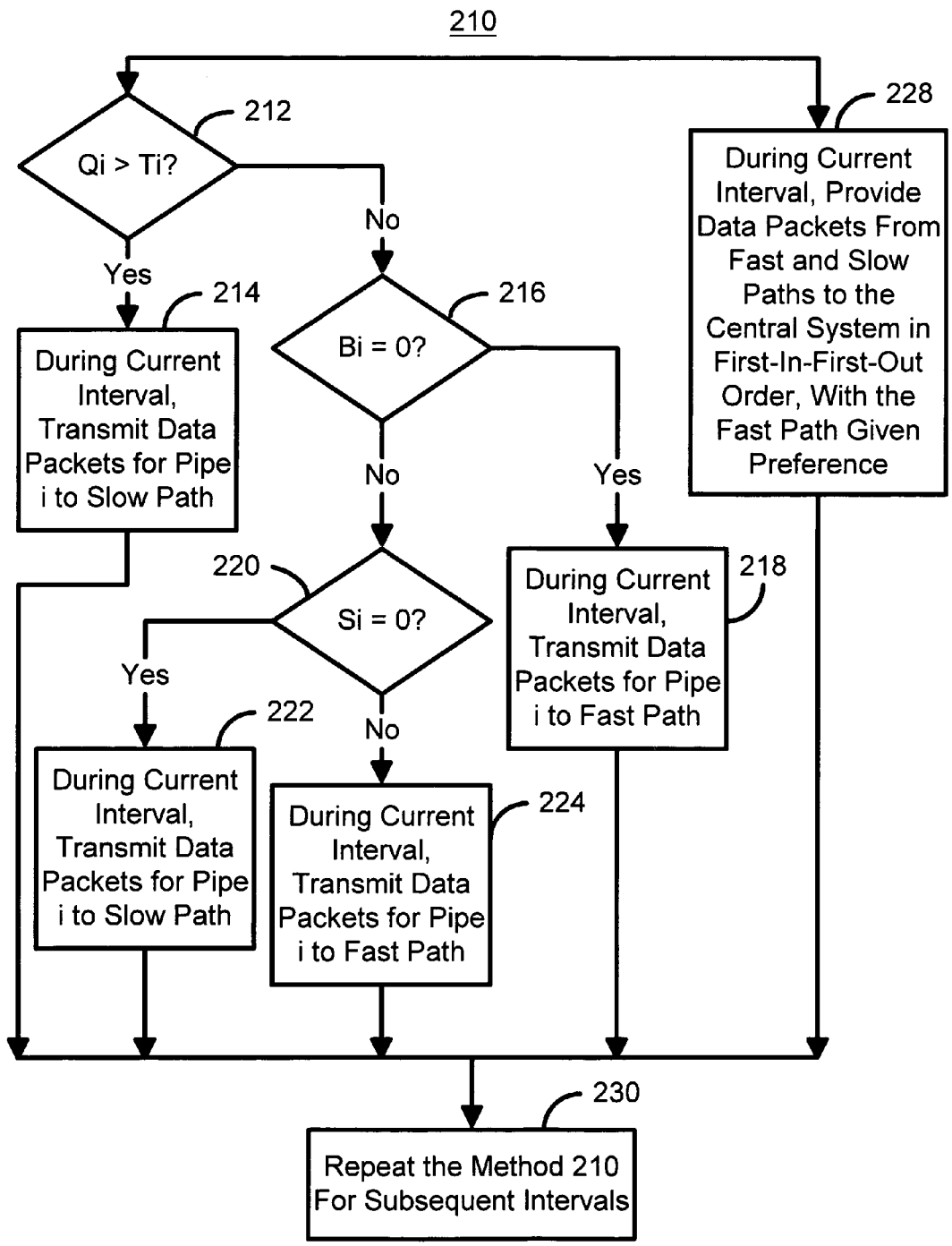
FIG. 4 is a more detailed flow chart of one embodiment of a method in accordance with the present invention for controlling traffic from a plurality of distributed systems to a central system.

FIG. 4 is a more detailed flow chart of a preferred embodiment of a method 210 in accordance with the present invention for controlling traffic from a plurality of distributed systems to a central system. The method 210 is preferably performed by the system 100 and for the central system 12', pipes 13', 15', 17', and 19' and the distributed systems 14', 16', 18', and 20'. The method 210 will, therefore, be described in the context of the system 100 and other components depicted in FIG. 2. Referring to FIGS. 2 and 4, the method 210 is preferably performed for each pipe 13', 15', 17', and 19'. For clarity, the method 210 is described in the context of the pipe i, which could be any of the pipes 13', 15', 17', and 19'.

Using the method 210, the traffic from the pipe i to the central system 12' is controlled in increments of time equal to the time interval. The method 210 preferably commences after the time interval for the pipe i is determined. The time interval for pipe i, $DT_i$, depends upon the maximum possible arrival rate (data packets per time), $A_i$, for pipe i and the capacity, $C_i$, of the fast path 104 for pipe i. In a preferred embodiment, the storage capacity for the fast path 104 is preferably the capacity of the fast storage 106. For the pipe i, the time interval, $DT_i$ is not greater than and proportional to the storage capacity of the fast path 104 for the pipe i divided by the maximum possible arrival rate for the pipe i, or $C_i/A_i$. Stated differently, $DT_i$ is $F_i(C_i/A_i)$, where $F_i$ is a factor for the $i^{th}$ pipe that is less than or equal to one. In a preferred embodiment, $DT_i$ is (⅛) $(C_i/A_i)$. In an alternate embodiment, a factor other than ⅛ could be used. For example, a factor of up to at least approximately ½ can be used. In general, the larger the time interval, the easier the method 210 is computationally, but the more likely that the fast path storage 106 will overflow. For smaller time intervals, it is less likely that the fast path storage 106 will overflow, but the method 210 is more computationally intensive. Thus, the appropriate factor can be selected for the pipe i. In a preferred embodiment, the time interval is set prior to the method 210 commencing. However, in an alternate embodiment, the time interval may be set as part of the method 210. In such an embodiment, the time interval may be adjusted throughout operation of the system 100.

For managing traffic for a current interval, it is determined whether the occupation $Q_i$ of the fast storage (or fast queue) 106 is greater than a particular threshold, via step 212. The threshold for the fast storage 106 for pipe i, $T_i$, may be set at a particular fixed value. In a preferred embodiment, the threshold is set such that the fast path storage 106 will not overflow. Consequently, the threshold is preferably set such that the threshold plus the maximum possible input rate for pipe i multiplied by the time interval is less than the storage capacity of the fast path storage 106 for pipe i. Stated differently, the threshold is set such that $T_i+A_i*DT_i<C_i$. In a preferred embodiment, the determination in step 212 is based on values for a previous time interval. In other words, at time T, step 212 determines whether the occupation for pipe i for a previous interval $Q_i(T-DT_i)$ is less than $T_i$.

If the occupation of the fast storage 106 for pipe i is greater than the threshold for pipe i, then the packets for the current time interval are provided to the slow path 108, via step 214. In a preferred embodiment, step 214 is performed by setting a transmission signal for the pipe i to a value corresponding to the slow path 108, and forwarding the data packets input for pipe i during the time interval based upon the transmission signal. The transmission signal for pipe i, $S_i$, is preferably a binary value. At one value, the transmission signal corresponds to the fast path 104. At the other value, the transmission signal corresponds to the slow path. In a preferred embodiment, $S_i(T)=1$ corresponds to the fast path 104, while $S_i(T)=0$ corresponds to the slow path 108. Thus, when $S_i(T)=1$, the data packets provided from pipe i from the time T to the time $T+DT_i$ are provided to the fast path 104. Similarly, when $S_i(T)=0$, the data packets provided from pipe i from the time T to the time $T+DT_i$ are provided to the slow path 108. Consequently, step 214 preferably includes setting $S_i(T)$ to zero and forwarding the packets arriving during the current time interval based on the zero value of $S_i(T)$.

If it is determined in step 212 that the occupation of the fast path storage 106 for pipe i does not exceed the threshold, then it is determined whether the slow path storage 110 for pipe i is empty, via step 216. The occupation of the slow path storage 106 for pipe i is given by $B_i$. When $B_i$ is zero, no packets for pipe i are contained in the slow path storage 106. In a preferred embodiment, the determination in step 216 is based on values for a previous time interval. In other words, at time T, step 216 determines whether the occupation of the slow path storage 110 for pipe i for a previous interval $B_i(T-DT_i)$ is zero.

If it is determined in step 216 that the occupation of the slow path storage 110 is zero, then the packets for the current time interval are provided to the fast path 104, via step 218. In a preferred embodiment, step 218 is performed by setting the transmission signal for the pipe i to a value corresponding to the fast path 104, and forwarding the data packets input for pipe i during the time interval based upon the transmission signal. Consequently, step 218 preferably includes setting $S_i(T)$ to one and forwarding the packets arriving during the current time interval based on the one value of $S_i(T)$.

If it is determined in step 216 that the occupation of the slow path storage 110 for pipe i is not zero, then it is determined whether the packets were being transmitted to the slow path, via step 220. Step 220 preferably includes determining whether the transmission signal is set such that data packets are sent to the slow path. In a preferred embodiment, the determination in step 220 is based on values for a previous time interval. In other words, at time T, step 220 determines whether the transmission signal, $S_i(T-DT_i)$ was set such that the data packets travel to the slow path (e.g. $S_i(T-DT_i)=0$).

If it is determined in step 220 that the transmission signal is set such that data packets travel to the slow path 108, then the packets for the current time interval are provided to the slow path 108, via step 222. In a preferred embodiment, step 222 is performed by setting the transmission signal for the pipe i to a value corresponding to the slow path 108, and forwarding the data packets input for pipe i during the time interval based upon the transmission signal. Consequently, step 218 preferably includes setting $S_i(T)$ to a zero and forwarding the packets arriving during the current time interval based on the one value of $S_i(T)$. If it is a determined in step 220 that the transmission signal is not set so that data packets travel to the slow path 108, then packets for the current time interval are provided to the fast path 104, via step 224. In parallel to steps 212 through 224, the data packets in the fast storage 108 and the slow storage 110 are provided to the central system 12' in a first-in-first-out order, via step 226. Once the current time interval expires, steps 212-228 are then repeated for the next time interval, via step 230. In repeating these steps, the next interval becomes the current interval (T goes to T+DT), and the current interval is the past interval (T–DT goes to T).

Thus, using the method 210, the system 100 can control traffic provided to the central system 12' from the distributed systems 14', 16', 18', and 20' through the pipes 13', 15', 17'and 19'. Because the data path 104, 108, or 112 is selected such that no packets are dropped, slower paths, such as the slow path 108, having greater storage capacity are used at times of higher congestion. Because the slow path 108 can be selected in times of greater congestion, the central system 12' may not be overwhelmed. Moreover, in a preferred embodiment, selection of the slow path 108 in the step 202 is limited. Instead, the more efficient fast path 102 is generally used. Data packets are preferably shunted to the slow path for the pipe 13', 15', 17', and 19' only during times of congestion for the pipe 13', 15', 17', and 19'. Consequently, performance of the system 10' is not compromised.

A method and system has been disclosed for controlling traffic from distributed systems to a central system. Software written according to the present invention is to be stored in some form of computer-readable medium, such as memory, CD-ROM or transmitted over a network, and executed by a processor. Alternatively, some of all of the present invention could be implemented in hardware. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for controlling flow of data packets in a computer system, the method comprising:
    receiving data packets at a central system from one of a plurality of pipes in the computer system for processing, each of the plurality of pipes connecting a different client system to the central system, the data packets being received during a time interval specific to the one pipe, each of the plurality of pipes in the computer system having a different time interval during which associated data packets are received;
    examining the data packets to determine whether to transmit the data packets on only one of a first path and a second path in the computer system such that none of the data packets are dropped before being outputted, the first path having a first storage that is a first type of storage, and the second path having a second storage that is a second type of storage, the first type of storage being smaller in size and faster in speed than the second type of storage, wherein only the first type of storage is used to store the data packets on the first path and only the second type of storage is used to store the data packets on the second path; and
    forwarding the data packets to only one of the first storage and the second storage based on examination of the data packets, the first storage being for transmission on the first path and not the second path, and the second storage being for transmission on the second path and not the first path, all of the data packets received during the time interval being transmitted on a same path.

2. The method of claim 1, further comprising:
    queuing the data packets received during the time interval in a memory of the computer system prior to examination of the data packets, wherein every data packet received from any pipe in the computer system is queued in the memory of the computer system before being examined.

3. The method of claim 1, further comprising:
    storing the data packets transmitted on only one of the first path and the second path in an output storage of the computer system prior to outputting the data packets, wherein every data packet transmitted on any path in the computer system is stored in the output storage of the computer system before being outputted.

4. The method of claim 3, further comprising:
    outputting the data packets from the output storage of the computer system in an order in which the data packets were received for processing, wherein every data packet outputted from the output storage of the computer system is outputted in an order in which the data packet was received for processing.

5. The method of claim 1, wherein forwarding the data packets to only one of the first storage and the second storage based on examination of the data packets comprises:
    forwarding the data packets to the second storage for transmission on the second path responsive to occupation of data packets from the one pipe in the first storage being greater than a threshold set for the one pipe during a previous time interval specific to the one pipe.

6. The method of claim 1, wherein forwarding the data packets to only one of the first storage and the second storage based on examination of the data packets comprises:
    forwarding the data packets to the second storage for transmission on the second path responsive to occupation of data packets from the one pipe in the first storage being less than or equal to a threshold set for the one pipe during a previous time interval specific to the one pipe,
    the second storage containing at least one data packet from the one pipe during the previous time interval specific to the one pipe, and
    data packets from the one pipe having been transmitted on the second path during the previous time interval specific to the one pipe.

7. The method of claim 1, wherein forwarding the data packets to only one of the first storage and the second storage based on examination of the data packets comprises:
    forwarding the data packets to the first storage for transmission on the first path responsive to occupation of data packets from the one pipe in the first storage being less than or equal to a threshold set for the one pipe during a previous time interval specific to the one pipe, and
    the second storage not containing any data packet from the one pipe during the previous time interval specific to the one pipe.

8. The method of claim 1, wherein forwarding the data packets to only one of the first storage and the second storage based on examination of the data packets comprises:
    forwarding the data packets to the first storage for transmission on the first path responsive to occupation of data packets from the one pipe in the first storage being less than or equal to a threshold set for the one pipe during a previous time interval specific to the one pipe,
    the second storage containing at least one data packet from the one pipe during the previous time interval specific to the one pipe, and
    data packets from the one pipe not having been transmitted on the second path during the previous time interval specific to the one pipe.

9. The method of claim 1, wherein the time interval specific to the one pipe is proportional to a storage capacity of the first storage for the one pipe divided by a maximum possible arrival rate of data packets for the one pipe.

10. The method of claim 9, wherein the time interval specific to the one pipe is one-eighth of the storage capacity of the first storage for the one pipe divided by the maximum possible arrival rate of data packets for the one pipe.

11. The method of claim 9, wherein the time interval specific to the one pipe is no more than one-half of the storage capacity of the first storage for the one pipe divided by the maximum possible arrival rate of data packets for the one pipe.

12. The method of claim 1, further comprising:
    setting a transmission signal for the one pipe to one when the data packets received from the one pipe are forwarded to the first storage for transmission on the first path.

13. The method of claim 1, further comprising:
    setting a transmission signal for the one pipe to zero when the data packets received from the one pipe are forwarded to the second storage for transmission on the second path.

14. The method of claim 5, wherein the threshold is set such that the threshold plus the maximum possible input rate for the one pipe multiplied by the time interval specific to the one pipe, is less than a storage capacity of the first storage for the pipe.

* * * * *